United States Patent [19]

Ledger

[11] Patent Number: 5,502,564
[45] Date of Patent: Mar. 26, 1996

[54] SUBSTRATE THICKNESS MEASUREMENT USING OBLIQUE INCIDENCE MULTISPECTRAL INTERFEROMETRY

[75] Inventor: Anthony Ledger, Newfairfield, Conn.

[73] Assignee: Hughes Aircraft Company, Los Angeles, Calif.

[21] Appl. No.: 304,982

[22] Filed: Sep. 13, 1994

[51] Int. Cl.⁶ .................................................. G01B 9/02
[52] U.S. Cl. ................................................ 356/355; 356/357
[58] Field of Search ...................................... 356/355, 357

[56] References Cited

U.S. PATENT DOCUMENTS 4,984,894  1/1991  Kondo .................................... 356/357

*Primary Examiner*—Samuel A. Turner
*Assistant Examiner*—Amanda Merlino
*Attorney, Agent, or Firm*—W. C. Schubert; W. K. Denson-Low

[57] ABSTRACT

An oblique incidence multispectral interferometric apparatus and the process of using it for measuring gross surface height errors of for measuring the total thickness of a substrate such as a semiconductor wafer or a photo mask. The instrumentation can be configured to either measure the air film between a reference flat and the substrate, or it can measure the air film on both sides of a substrate placed between reference flats. If the substrate is a flexible silicon wafer then it can be held against a known reference flat using a vacuum or other suitable means or the wafer surface can be measured from both sides in a free standing mode. In all cases the thickness map of the air space or spaces between the substrate surface or surfaces and a corresponding calibrated reference surface is measured using multispectral pattern matching.

22 Claims, 6 Drawing Sheets

SUBSTRATE THICKNESS MEASUREMENT USING OBLIQUE INCIDENCE MULTISPECTRAL INTERFEROMETRY

BACKGROUND OF THE INVENTION

1. Field of the Invention

The present invention relates generally to the use of multispectral interferometry for measuring the thickness of, or for the thickness mapping of substrates such as semiconductor wafers, photo-masks, or the like.

2. Prior Art

Capacitance gauges by ADE Corp. are currently used to scan over a semiconductor wafer to generate a thickness map. Although accurate to 0.1 microns they suffer from poor spatial resolution due to the size of the probe.

Oblique incidence optical interferometry at a single wavelength has been used by GCA-Tropel to measure large path differences. While this method could be adapted in accordance with this invention to make measurements it uses a large prism whose size and thickness becomes very large as the semiconductor wafer diameter increases. The oblique incidence system can create a thickness map of a highly distorted surface.

The GCA/Tropel Autosort™ system consists of a grazing incidence Fizeau interferometer illuminated by a He-Ne laser at 0.6328μ.

Interferemetric measurement of optical surfaces using a single wavelength Fizeau Interferometer results in ambiguities if the surface deviates from a plane by more than half a wave. This limitation has been minimized in the GCA/Tropel Autosort™ system by making single wavelength measurements at grazing incidence to reduce the optical path in the medium separating the two surfaces.

A second method of expanding the thickness range has been implemented in a Hughes full wafer mapper PD9103 1 which uses multi-spectral imaging at normal incidence together with pattern matching of reflectance spectra to determine film thickness' up to 8μ of silicon, 20μ of SiO2 and 30μ of air. This instrument is available from Hughes Danbury Optical Systems, Inc., Danbury, Conn. and is similar to the apparatus described in U.S. Pat. No. 5,333,049 to A. M. Ledger, the inventor herein.

In order to prepare thickness maps of a substrate such as silicon wafer it is desirable to unambiguously measure large thickness variations using a visible imaging system. For example AccuFlat™ wafers require that a thickness map of a silicon wafer, be measured to 0.05μ (relative not absolute) and that this map should be accurate out to the edge of the wafer with a spatial resolution which matches that used by the PACE wafer flattening system. The PACE wafer flattening system does not form part of this invention. It comprises a plasma assisted chemical etching technique which is the subject of numerous patents assigned to Hughes Aircraft Company, the assignee of the instant invention. Currently wafers are measured before and after polishing using a capacitance technique which does not give very accurate results out to the edge of the wafer. Typically a grid of 64×64 or 126×126 points are needed over a 200 mm diameter wafer to assure correct polishing, which defines the spatial frequency needed.

SUMMARY OF THE INVENTION

This invention relates to an oblique incidence multispectral interferometric measuring system and process for using such a system for measuring gross surface height errors and also for measuring the total thickness of a substrate such as a semiconductor wafer or a photomask or any other substrate requiring a precision surface or a uniform thickness. The instrumentation can be configured to either measure the air film between a reference flat and the substrate, or it can measure the air film on both sides of a substrate placed between reference flats. If the substrate is a flexible silicon wafer then it can be held against a known reference flat using a vacuum or other suitable means or the wafer surface can be measured from both sides in a free standing mode. In all cases the thickness map of the air space or spaces between the substrate surface or surfaces and a corresponding calibrated reference surface is measured using multispectral pattern matching techniques. Multispectral pattern matching techniques are described in the aforenoted U.S. Pat. No. 5,333,049.

If the wide dynamic range of multi-spectral imaging is combined with oblique incidence illumination (up to and including grazing incidence) then the dynamic range expands still further and allows measurements of film thickness' of hundreds of microns to be made. Instruments incorporating this expanded range are provided in accordance with this invention. In accordance with one embodiment of the invention an oblique incidence imaging instrument is provided which can measure large surface flatness errors of a single optical surface of a substrate such as a standard silicon wafer. In accordance with another embodiment it can also be used to measure the thickness of the substrate by placing the wafer between two calibrated optical flats and measuring the large air paths or films above and below the wafer. In accordance with yet another embodiment of the invention the substrate is held vertically between two calibrated optical flats to avoid the effects of gravity on the wafer and the large air paths or films on either side of the substrate are measured to determine thickness.

The instruments of this invention are capable of providing full wafer imaging substantially out to the edges of the wafer with spatial resolutions superior to capacitance probes. They allow large surface height variations of tens of microns, to be unambiguously measured. The invention can be used with both absorbing and non-absorbing surfaces. Measurement of photomasks can also be carried out using this invention. It can be used to measure the surface figure of photo masks or to measure the total thickness of a substrate such as a silicon wafer.

Accordingly it is the aim of the present invention to provide an oblique incidence multispectral interferometric apparatus and process for measuring gross surface height errors or for measuring the total thickness of a substrate.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

In the description which follows numbers which are primed or multiply primed refer to different embodiments of similar elements without primes. Oblique incidence as the term is used herein refers to incidence angles greater than about 0° up to less than about 90°. Oblique incidence means that the incident and reflected light beams travel in different directions. Grazing incidence as the term is used herein refers to incidence angles of greater than about 85° up to less than about 90°. Normal incidence as the term is used herein refers to incidence angles of about 90°.

Figure 1:
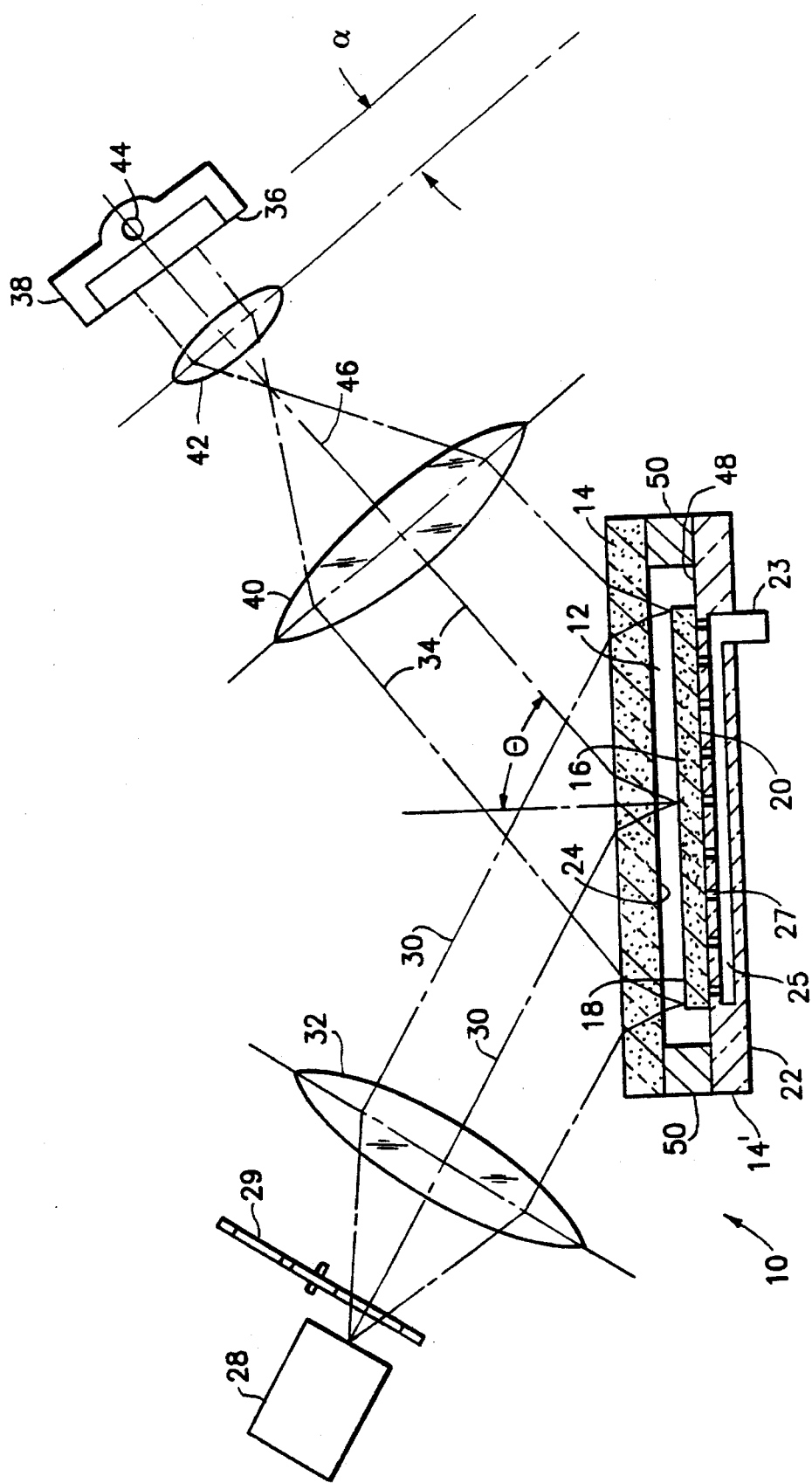
FIG. 1 is a schematic sectional view of an oblique incidence multispectral imaging system in accordance with one embodiment of this invention for measuring the air film between a reference flat and a substrate.
Figure 2:
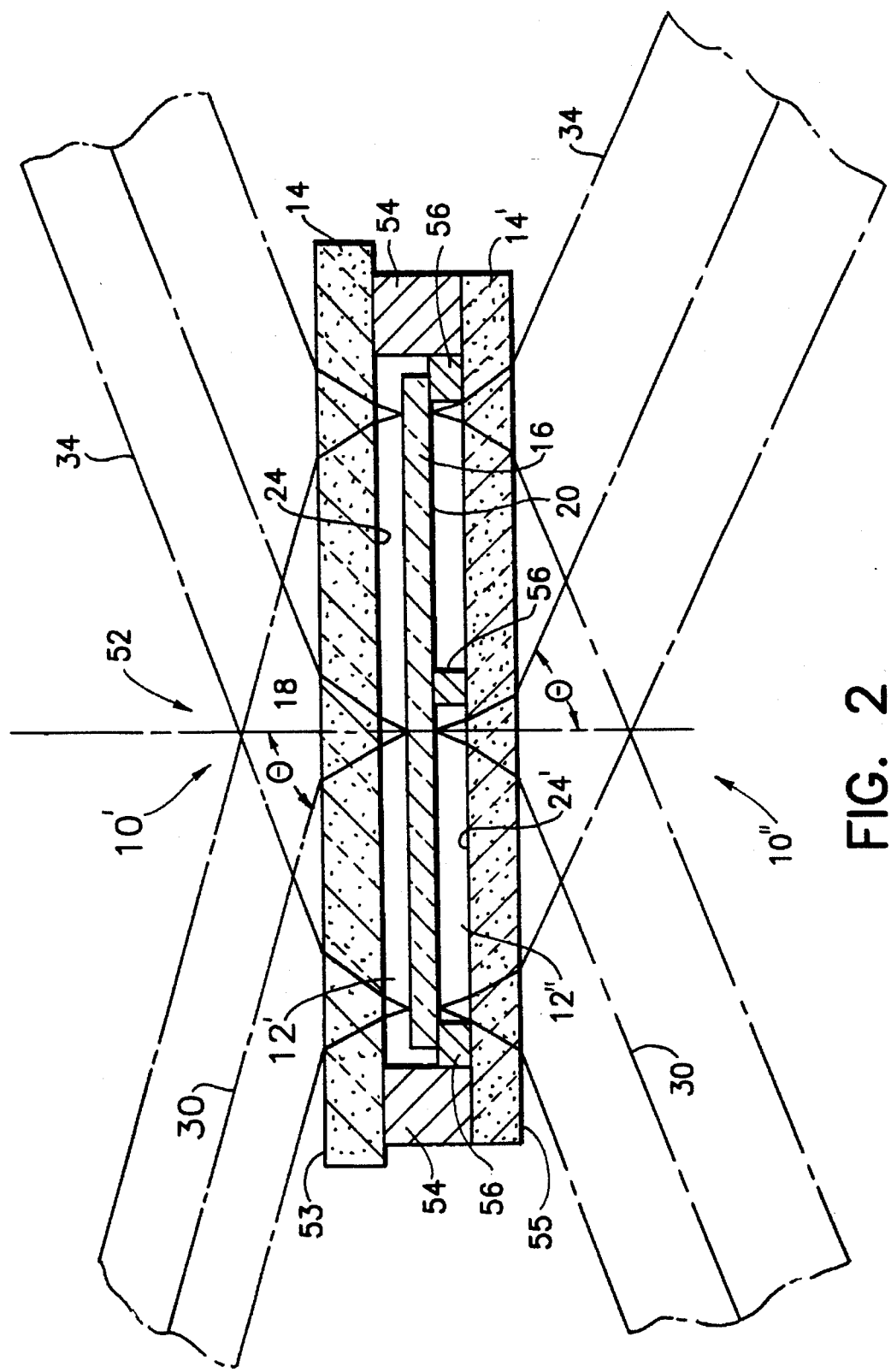
FIG. 2 is a partial schematic sectional view of an oblique incidence multispectral imaging system in accordance with another embodiment of this invention for measuring the air film on both sides of a substrate placed between reference flats.

This invention relates to an oblique incidence multispectral interferometric measuring system and the process of using it. It can be used both for measuring gross surface height errors and also for measuring the total thickness of a substrate such as a semiconductor wafer, photomask or other substrate or surface having a precision surface finish or thickness. Referring to FIG. 1, the system 10 can be configured to either measure the air film, air space or air gap 12 between a reference flat 14 and the substrate 16, or as shown in FIG. 2 it can measure the air films 12' and 12" on opposite sides 18 and 20 of a substrate 16 placed between reference flats 14 and 14'. If the substrate is a flexible semiconductor wafer 16 such as a silicon wafer it can be held against a known reference flat 14 as in FIG. 1 using a vacuum chuck 22 or the wafer surfaces 18 and 20 can be measured from both sides in a free standing mode as in FIG. 2. In all cases a thickness map of an air space 12, 12' or 12" between the substrate surface 18 or surfaces 18 and 20 and a corresponding calibrated reference surface 24 or 24' is measured using multi-spectral pattern matching techniques.

Multispectral pattern matching techniques are described in the aforenoted U.S. Pat. No. 5,333,049, which is specifically incorporated by reference herein. They consist of a comparison between a measured spectral pattern (fringe pattern) and a theoretically computed set of spectral patterns. The set of theoretical spectral patterns correspond to spectra for many different values of a parameter such as film thickness. A least squares method as described in the '049 patent is used which subtracts each measured value from the corresponding theoretical value and searches for the minimum value of this sum. If the measured spectrum and a particular calculated spectrum are the same, then the sum of the differences will be zero. A search through the library of all the precomputed patterns thus leads to a match and thus determines the measured or unknown parameter. The optical imaging instrument 10 in accordance with this invention records oblique incidence multi-spectral images of a substrate surface 18 or 20. It can also be used to measure the surface figure of photo masks or to measure the total thickness of a substrate 16 such as a semiconductor wafer.

Figure 7:
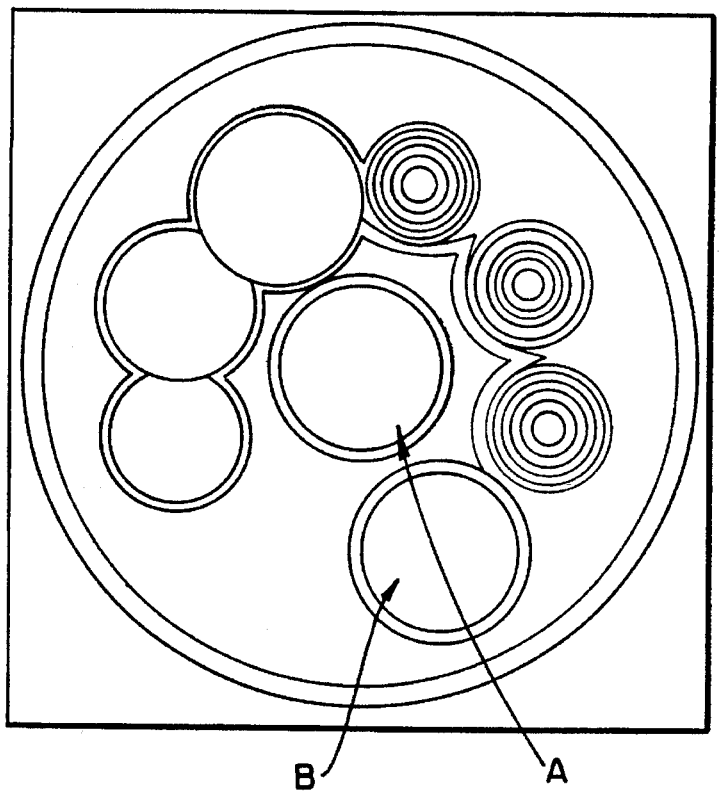
FIG. 7 is a test pattern generated using a Fizeau interferometer.

A surface figure is the deviation from a required or perfect surface. Low surface figure errors indicate high quality optical surfaces are usually polished to a fraction of an optical wavelength. Typically a wavelength in the visible region has values which extend from about 0.4 to 0.7 microns and consequently the surfaces will only deviate from the required surface by tens of microns. If surface deviations exceed half a wave then these are referred to as gross figure errors. FIG. 7, which will be described later, shows gross figure errors where the deviation is so large and the surface slope so high that the fringes merge together and the surface cannot be measured.

While the system 10 of this invention is primarily concerned with measuring the thickness or surface variations of semiconductor wafers such as silicon wafers it can also be used to measure the surface figure of photo masks or the thickness or surface variation of any desired substrate or surface.

FIG. 1 shows a Fizeau optical imaging system 10 in accordance with this invention which creates Fizeau fringes in the thick air space 12 by illuminating the substrate surface 18 and reference surface 24 with filtered light at oblique incidence. The light source 28, preferably is a multispectral light source with a bandwidth of from about 10μ to about 50μ. The light source 28 can be a filtered light source or a monochromator. A suitable light source 28 is described in U.S. Pat. No. 5,291,269, to A. M. Ledger, the inventor herein, which patent is specifically incorporated by reference herein. It describes a suitable light source for correctly illuminating a bent reflecting surface. The monochromator 28 has the advantage of readily providing more wavelengths with the use of a conventional filter wheel 29. Filtering the incident light from the source 28 is preferably done using a set of filters 29 between the source 28 and the lens 32 with bandwidths of less than 1% (¼% to ½% is possible with custom designed filters).

The incident light 30 is collimated by lens 32 and directed at an incident angle θ to the normal 34 to the plane of the substrate 16, wherein θ is from about 70° to about 85° and preferably from about 78° to about 82°. The incident light 30 is refracted by the reference flat 14 and the air space 12 and then reflected from the substrate surface 18. After reflection the reflected light 34 is again refracted by the air space 12 and reference mat 14. Some of the incident light 30 is also reflected by the reference surface 24 so that the phase difference between the light reflected by the substrate surface 18 and that reflected by the reference surface 24 provides the desired Fizeau fringes used for the thickness measurement or surface mapping.

An image of the Fizeau fringes on the substrate surface is formed on a CCD array 36 of an electronic camera 38 by the combination of a collimator optic 40 (long focal length lens, parabola or sphere or a combination of these) and an imaging lens 42. The oblique incidence illumination means that only a thin slice of the substrate surface 18 would be in focus if a conventional lens/camera is used by the entire substrate surface 18 image can be brought into focus by tilting the CCD array 36 about pivot 44 through an angle e as shown in FIG. 1 with respect to the imaging lens 42. This produces a Keystone effect as a first order geometric distortion but the final thickness or figure map can be easily mapped using images of a calibration grid. The amount of image tilt $\alpha = \theta/m$, where as shown in FIG. 1, $\theta$ is the tilt angle of the wafer 16 with respect to the collimator axis 46 and m is the total demagnification used to image the wafer onto the CCD array 36. Thus for example for a 6.6 millimeter CCD array 36 a wafer 16 tilt angle $\theta$ of 80 degrees becomes an image tilt $\alpha$ of a few degrees since the wafer is usually demagnified by a factor, of for example, about 30. Such small tilt angles are easily compensated for using the lens 42 and pivotal CCD array 36 arrangement. For example imaging a 200 millimeter wafer 16 inclined at 85 degrees to the optical axis 46 of the camera lens 42 onto a 6.6 millimeter CCD array 36 will tilt the wafer image by 2.83 degrees. Tilting the CCD array 36 about pivot 44 with respect to the camera lens 42 by this amount will maintain the wafer image in focus over the full wafer area and allow 512 pixels to cover the wafer axes and to provide the same data density as at normal incidence.

If a substrate 16 such as a silicon wafer can be made to conform exactly to the optically polished surface 48 of a vacuum chuck 22, whose optical figure map is known, then a single sided measurement can be made of the air space 12 between the wafer top surface 18 and the optical reference surface 24 of reference flat 14. While a vacuum chuck 22 is shown by way of example any desired chuck for securing the wafer 16 to the polished surface could be used. For example, the wafer 16 could be held in place by electrostatic means or even mechanically secured by some form of clamp. The vacuum is drawn through orifice 23 connected to a vacuum source such as a pump (not shown). The vacuum communicates with the substrate 16 via a plenum 25 and hoses 27 extending through the surface 48 of the chuck 22. The vacuum chuck face plate 22 is preferably transparent so that any bottom correction air space (not shown) between the back surface 20 of the wafer and the chuck face 48 can be measured (or monitored) using a conventional normal incidence multi-spectral interferometer. The top optical reference flat 14 rests on fixed height pads 50. The space 12 between the chuck surface 48 and the reference surface 24 without a wafer 16 present can be measured or mapped to about 0.5 micron and preferably to about 0.01 micron. In this way the wafer 16 thickness map can be obtained by subtracting the measured air space 12 with the wafer 16 present and the bottom correction air space, if any, from the two surface 24 and 48 height map generated without the wafer 16 present. As the design of optical quality chucks 22 progress, this bottom correction air space measurement should become simpler or hopefully prove to be unnecessary if the wafer can be made to conform to the chuck surface 48 to better than about a tenth of a wave.

A free standing measurement of the substrate 16 can also be made by utilizing a substrate support system 52 as shown in FIG. 2 in place of the substrate support system 54 shown in FIG. 1. In FIG. 2 for simplicity sake the imaging system 10' does not show the light source 28, lens 32, lens 40, lens 42, CCD array 36 and camera 38, however, they are included in the same arrangement as described by reference to FIG. 1. While the embodiment of FIG. 1 included only one imaging system 10 in accordance with this invention, the embodiment of FIG. 2 includes two such systems 10' and 10" arranged in mirror image fashion about opposite sides 53 and 55 of the substrate support system 52.

In this embodiment substantial air gaps 12' and 12" occur both above and below the substrate 16. The respective first and second reference flats 14 and 14' are spaced apart by spacer blocks 54. The substrate 16 is supported on support blocks 56 so that it is spaced apart from the respective first and second reference surfaces 24 and 24' of the reference flats 14 and 14'. The two surface space between the reference surfaces 24 and 24' without a wafer 16 present can be measured or mapped to about 0.5 micron as in the previous embodiment. In this way the wafer 16 thickness map can be obtained by subtracting the measured air spaces 12 and 12' with the wafer 16 present from the two surface 24 and 24' height map generated without the wafer 16 present. If the lower surface 20 of the substrate 16 is ground as may be the case with a silicon wafer, it is still possible to obtain a map by illuminating the bottom surface at a higher incidence angle $\theta$ to obtain enough reflectivity to form fringes.

In practice the reference flats 14 and 14' are optical glass flats and the spacer blocks 50 or 54 have a height which will provide an air space 12 12' or 12" of at least about 20 microns and preferably from about 20 to about 100 microns when the substrate is placed into the substrate support system 52 or 54. In the embodiment of FIG. 2 the substrate support blocks 56 generally have a height of from about 20 to about 100 microns to provide air spaces 12' and 12" of about the same height. The spacing between the respective first and second glass flats 14 and 14' in FIG. 2 is therefore typically made up of a first airspace 12' of from about 20 to about 100 microns, a wafer thickness of about 625 +/−12 microns and a second air space 12" of from about 20 to about 100 microns.

The spacer blocks 50 or 54 or the support blocks 56 preferably are glass cylinders whose ends are polished. The first ends of the spacer blocks 50 or 54 or the support blocks 56 are placed in contact with the respective surface 24 or 24' of the flats 14 and 14' and their opposing ends are placed in contact with the respective opposing surface 24 or 24' of the flats 14 or 14' or the opposing first 18 and second 20 sides of the wafer 16, as the case may be. The spacer blocks 50 or 54 are preferably arranged at three points around the periphery of the flats spaced about 120 degrees apart. The support blocks 56 are also preferably arranged at three points about the periphery of the substrate spaced about 120 degrees apart. The distance between the respective flats 14 and 14' or the distance between a flat 14 or 14' and a respective surface 18 or 20 of the wafer 16 can thus be determined by prior measurement of the glass cylinders using conventional interferometric gauging equipment to an accuracy of about 0.05 microns. While glass cylinders are preferably used any desired material of any desired shape could be used in their place.

Figure 3:
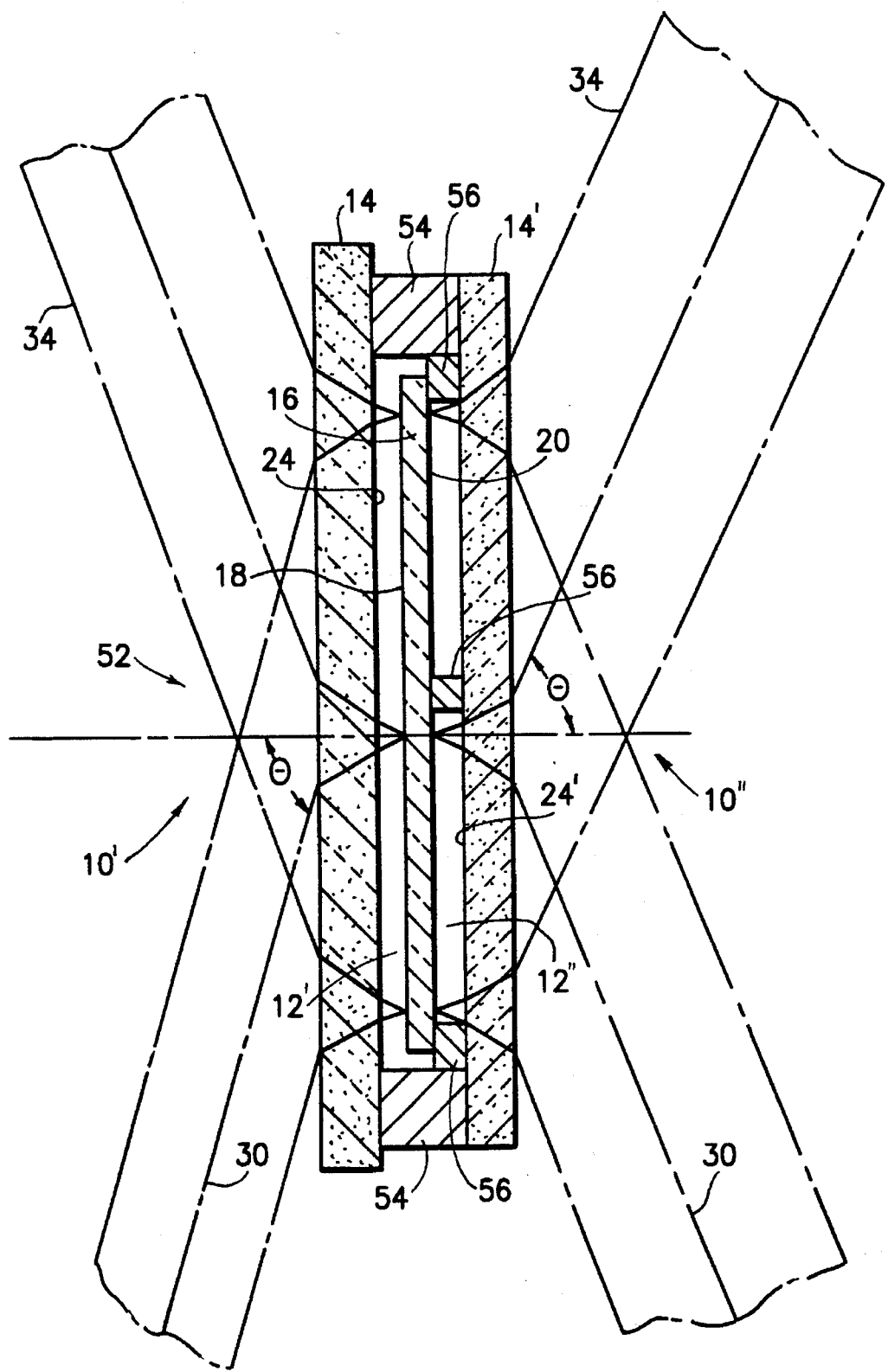
FIG. 3 is a partial schematic sectional view of an oblique incidence multispectral imaging system similar to that set forth in FIG. 2 wherein the substrate is substantially vertically positioned to avoid gravitational effects on the substrate.

Referring now to FIG. 3 a further embodiment of the invention is shown which in most respects is identical to that described by reference to FIG. 2 with the exception that the substrate support system 52 is oriented so that the plane of the substrate 16 is generally vertical as opposed to generally horizontal in FIG. 2. Other than the generally vertical orientation of the systems 10', 10" and 52 the only change which is necessitated by this arrangement is to provide opposing substrate supports 58 to hold the substrate 16 in place in the vertical orientation. These supports may be of any desired design but preferably are formed of a resilient material which will hold the substrate against the optically flat substrate supports 56 without distorting the substrate. The advantage of this embodiment over that described in FIG. 2 is that gravity effects on the substrate flatness are substantially eliminated. The measurements would be carried out in the same manner as the embodiment of FIG. 2.

Avoiding contact between the substrate 16 and the reference surfaces 24 and 24' is preferable, as in the embodiments of FIGS. 2 and 3, so as to minimize damage, scratches and contamination etc., but requires that the intervening air space should be made as large as possible. Maximizing the air space can be done in two ways i.e.

1) Increase the coherence length of the incident illumination 30 by reducing the optical bandwidth of all the filters which are used or by using a narrow band monochromator as the source.

2) Increase the incidence angle to reduce the optical path in the intervening air space 12, etc.

It has been shown analytically that a combination of both techniques provides high visibility fringes using optical bandwidths in the range of about 10 to about 50Å, incidence angles in the range of about 70 to about 85 degrees and air spaces 12, 12' or 12" of up to about 100 microns. This large air space simplifies the alignment and positioning of the reference surface 24 over substrate 16 and reduces the possibility of damage and contamination if the air spaces above and below a substrate such as a silicon wafer are measured In this way, and the separation of the two reference surfaces 24 and 24' is preferably known to about $0.1\mu$ or better then the relative variations in wafer thickness can be determined. Alternatively the wafer can be flattened by a vacuum chuck 22 ( or other type of chuck used for this purpose) with a surface 48 preferably polished to about ½0th of a wave and a single reference surface 12 above the wafer can be used. Polishing the surface to about ½0th of a wave is a practical limit, however, if required by future technology better surfaces can be made. For example, it is possible to polish such a surface to ½00th of a wave over a 200 millimeter aperture but there is no requirement to flatten wafers to better than about 0.05 microns or to hold them flat to smaller numbers. Calculations show that the angle and bandwidth can be chosen to measure air spaces 12, 12' or 12" greater than 700 microns, which is greater than a typical wafer 16 thickness.

The proposed systems 10, 10' and 10" of this invention include the following features: no moving parts or scanning systems are required other than a method of changing the wavelength; full wafer images are collected by the CCD array 36 of the electronic camera 38 at the different wavelengths.

Adding a broadband polarizer, (as by using the filter wheel 29), between the source 28 and the wafer 16 allows a further degree of freedom to be added to the numeric library used to pattern match the spectra in that reflectance maps can now be taken in two polarization states. This added information can be used to reduce the number of filters 29 or can be used as the basis of a full aperture imaging ellipsometer to allow the optical properties (n & k values) of planar layers to be evaluated. In either case the system could be an accurate oblique incidence polarization dependent reflectometer to provide the thickness or ellipsometric features.

The refractive index of an optical material is usually given the symbol n in the literature, but the use of a single real number only refers to a material which is optically transparent. If a material absorbs radiation, such as a metal surface or silicon for example, then a complex refractive index has to be used wherein n is the real part and k is the imaginary part of the refractive index. These values in general can only be measured by ellipsometric techniques which measure the reflectance of a sample in two orthogonal states of polarization at a non-normal incidence. Since two measurements are used one can determine two unknowns, i.e. the n and k values at a specific wavelength used and must therefore be accurately known over the spectral range in use. In this type of multispectral measurement the wavelength limits are from about 0.4 to about 0.95 microns and are limited principally by the sensitivity of commercially available CCD cameras.

The optical surface of quartz photo-masks can also be measured by oblique incidence multi-spectral interferometry but here the stiffer substrates 16 only require that one surface be measured against a calibrated optical flat 14 as in FIG. 1.

The PACE process used to manufacture AccuFlat™ wafers as described above does not need an absolute thickness map but only a relative thickness map which determines how much material to remove from one surface of the wafer 16. The instruments 10 or 10' described above will provide a relative map since the measurement of the inter-flat air space between surfaces 24 and 24' or between the surfaces 24 and 48 as the case may be will be in error by a given or fixed offset.

The approach based upon grazing incidence illumination using a single narrow band He-Ne laser will now be compared with the multi-spectral approach using discrete filters or a conventional monochromator. In the prior art grazing incidence system a large prism defines the incidence angle in the air space 12 etc. and facilitates the alignment and imaging of the Fizeau fringes localized in the air gap. This system was developed for the measurement of 5"×5" square photo masks, and would require a much wider and thicker prism if it were used to measure the surfaces of 200 mm or larger wafers. If surface separations between the reference prism and the sample in the 100 micron region are to be measured then it requires light to be incident within an incidence angle of 89.9 degrees to avoid ambiguities.

The mathematical functions which describe the reflectance of thin multilayer structures at a particular wavelength at normal incidence contain "circular functions" like $\sin(2\pi t/\lambda)$, where n is the real part of the refractive index, t is the film thickness and $\lambda$ is the wavelength. Functions like these give the same value when the thickness t is increased by multiples of a half wave $\lambda/2$, i.e. when $t=\lambda/2, 2\lambda/2, 3\lambda/2, 4\lambda/2$, etc. Consequently, the reflectance of single film layer (air space 12, 12' or 12") cycles through a range of values as the film thickness increases and one cannot determine the real thickness from a single measurement due to the $\lambda/2$ ambiguity. The circular functions at non-normal oblique incidence are $\sin(2\pi n t \cos(\theta)/\lambda)$ where $\theta$ is the angle in the film material. At higher incidence angles, $\cos(\theta)$ becomes small so that larger values of t can be measured before the measurement once again becomes and the circular functions describing the reflectance begin to repeat.

Figure 4:
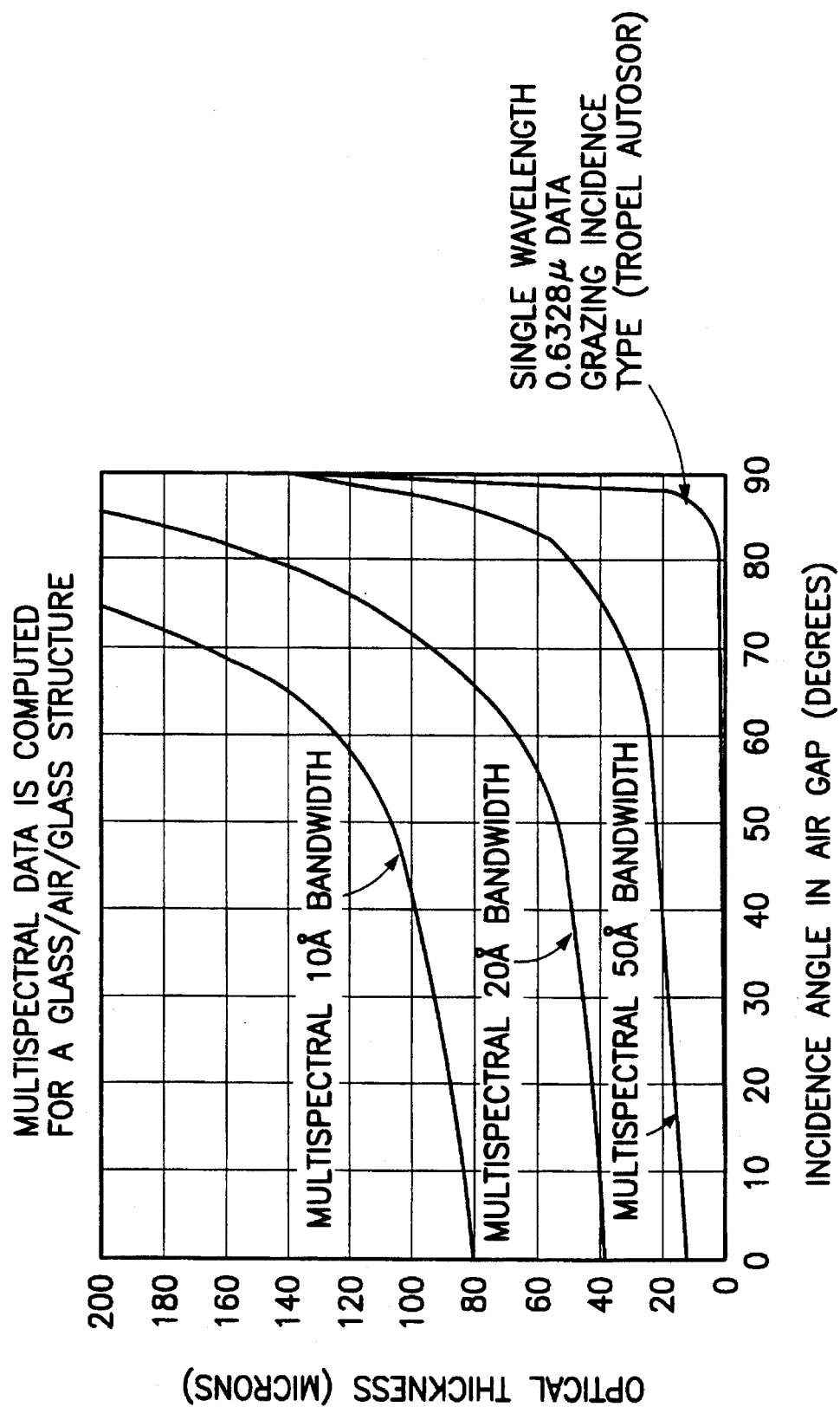
FIG. 4 is a graph comparing the thickness which can be measured as a function of incidence angle for the oblique incidence multispectral imaging system of this invention and for a single wavelength grazing incidence system of the prior art.

In the multi-spectral systems 10, etc. of this invention as shown in FIGS. 1, 2, or 3, the maximum unambiguous thickness is in the micron range even at normal incidents; and this can be increased by a factor of 10 or so without approaching grazing incidence. A comparison of the thickness' which can be measured as a function of incidence angle for the two cases is shown in FIG. 4. The curve for the grazing incidence case is computed assuming that the maximum path difference is a half wave which gives the required angle as $\theta=\arccos(\lambda/2\delta)$ where $\lambda$ is the wavelength and $\delta$ is the separation-between the substrate 16 and the glass reference surface 24. In this case the optical bandwidth is extremely small and coherence effects do not limit the measurement. The maximum thickness curve for the multi-spectral case of this invention has to be computed for a given bandwidth, spacing, incidence angle and polarization (unpolarized light is used for the calculations for FIG. 4) by making an assumption about the acceptable fringe visibility which will produce an accurate measurement. The dynamic measurement range is determined principally by the coherence length of the light used to illuminate the air film 12, 12' or 12" structure. The coherence length "LC" at a wavelength $\lambda$ is defined as $LC=\lambda^2/\Delta\lambda$ where $\Delta\lambda$ is the filter bandwidth. The coherence length merely provides an upper limit to the allowed path differences since the fringe visibility is proportional to the function $[sine(x)/x]^2$ for a flat topped band shape, where x is the optical phase difference. Typical commercial narrow, band filters in the visible/NIR have 1% bandwidths and so will provide coherence lengths of approximately 40 to 90µ in the visible region but in practice high visibility fringes require that path differences be limited to 10% or 20% of the coherence length. If the bandwidth of the filters degrades the reflectance maxima by 10% to 20% then it has been shown experimentally that accurate measurements can be made if the shape of the filters are included in the pattern matching spectral libraries.

The finite bandwidths found in real optical filters leads to a degradation of the signal level of the interference fringes. The spectral reflectance pattern of a single film of air (air space 12,12' or 12") looks like a sine wave as a function of wavelength and the frequency of this sine wave increases as the air film becomes thicker. This sine wave reflectance spectrum is computed for a single wavelength at each point and maximum signal is obtained. However, if the optical bandwidth of the filters used is finite then the reflectance at each point must be obtained by averaging the reflectance over the filter bandwidth and if the width of the filter is comparable to the width between successive maxima or minima in the reflectance curve then the dine wave amplitude is degraded. If these effects are included in the theoretical library in the computer then an accurate measurement can be made up to the point where the film becomes so thick that any spectral signature is averaged out.

It should be noted that the multi-spectral system 10 of this invention is achromatic since it uses only a plane parallel plate in collimated space as a reference. The collimated coherence length of a few hundred microns also avoids speckle effects and spurious coherent reflections from the other surfaces in the instrument. These effects can occur in the He-Ne based grazing incidence approach.

Figure 5:
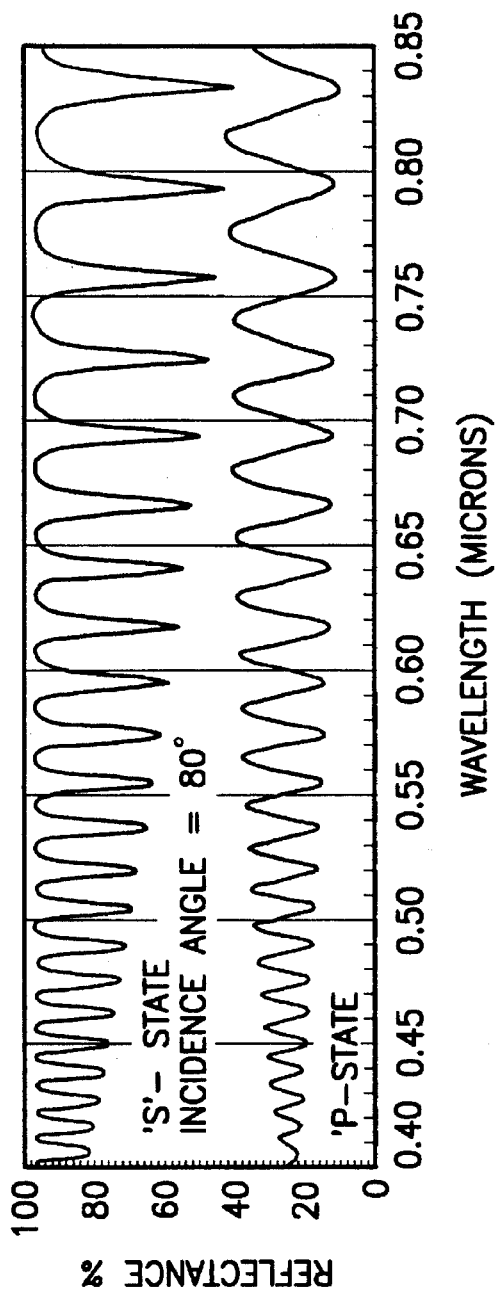
FIG. 5 is a graph showing 'S' and 'P' polarization reflectance levels provided by the oblique incidence multispectral measuring system of this invention with a bandwidth of 50Å and an incidence angle of 80°, for a 50μ air film between a substrate and a glass plate.
Figure 6:
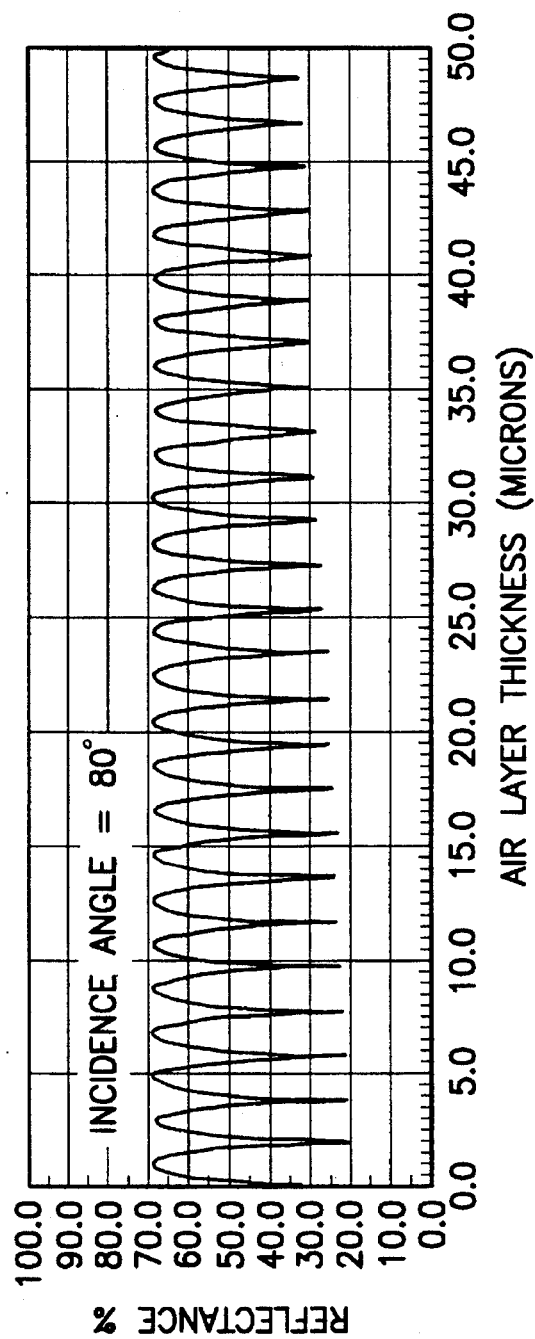
FIG. 6 is a graph showing the unpolarized reflectance levels provided by the oblique incidence multispectral measuring system of this invention with a bandwidth of 50Å and an incidence angle of 80° as the air film gap thickness is increased between a substrate and a glass plate.

The reflectance of an air film 12 at oblique incidence depends upon both the refractive indices on both sides of the film as well as the polarization of illumination. FIG. 5 shows the 'S' and 'P' polarization reflectance levels expected for a 50µ air film with silicon on one side and glass on the other where the bandwidth is 50Å, where 'P' comprises light polarized in the plane of incidence and 'S' comprises light polarized perpendicular to the plane of incidence. These curves show that a strong spectral signature is available even with such a large bandwidth. FIG. 6 shows the reflectance variations with air space thickness at 80 degrees, for a 50Å bandwidth, but at a single wavelength of 0.65µ. These parameters determine the fringe visibility and together with the number of wavelengths used in the pattern matching, determine the accuracy of the measurement.

Figure 8:
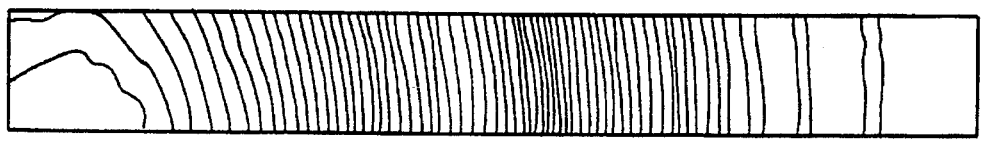
FIG. 8 is a high magnification view of the center pattern A in FIG. 7.
Figure 9:
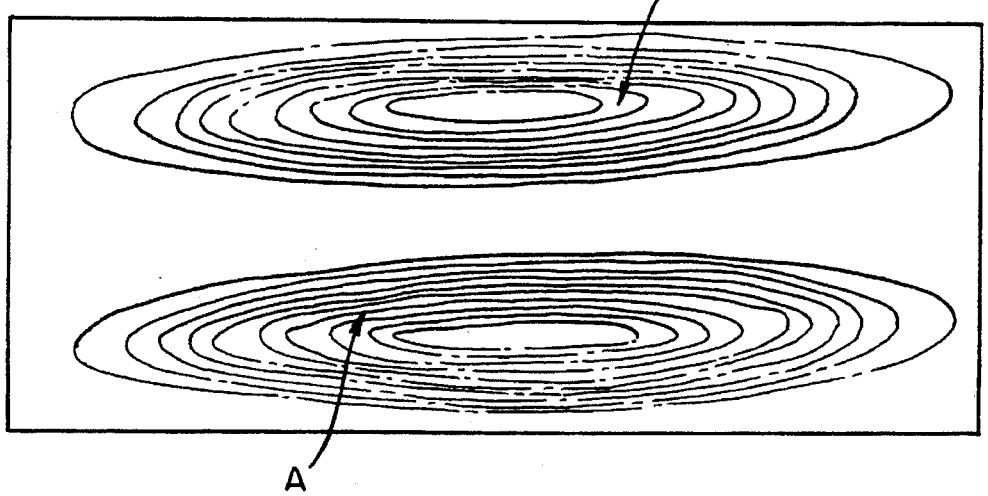
FIG. 9 is a view of the center pattern A and the bottom pattern B using the oblique incidence multispectral measuring system of this invention at an incidence angle of 81° showing a reduction in fringe count as compared to FIG. 8.

Images of oblique incidence fringes have been recorded using a collimated beam at approximately 80 degrees and at 0.72 microns using a filter of nominal 60Å bandwidth (not a square bandpass). In FIG. 7 the test pattern substrate was a fused silica plate target flat into which a series of 25 micron deep bowl shapes was etched. The fringes were formed simply by laying an optical flat on the top of the target flat. The image in FIG. 7 is that obtained using a conventional Fizeau fringe wafer mapper system. The 25 micron deep areas cannot be resolved since the surface slopes are too high. The image of FIG. 8 shows at high magnification the "A" region in FIG. 7 and shows approximately 58 fringes from center to edge in less than half an inch. When viewed in accordance with this invention at an oblique angle of about 80 degrees, the fringe count is reduced to 9 as shown in FIG. 9 for regions "A" and "B" in FIG. 7. The elliptical fringes are only in focus over a short region since the camera 38 was not tilted with respect to the lens 42. Tilting the CCD array 36 as described above should spread the required image back over all the pixels and ensure that all are in focus.

The techniques for image mapping and thickness measurement using the fringes generated by the oblique incidence multispectral interferometric apparatus of this invention may be any well known approach using Fizeau or similar type fringes. Generally if the wafer were perfectly flat straight equally space fringes would result. Surface height variations in the wafer cause the fringes to deviate from straightness or in separation which can be imaged in the above described manner for image mapping or thickness measurement. The electronic camera 38 is capable of generating a fringe map as in FIG. 7 or the electronic data from the camera and its image can be manipulated with a computer using conventional techniques to generate the thickness maps and thickness measurements. For example using the computer techniques described in the earlier patents of the inventor herein, namely, U.S. Pat. Nos. 5,331,049 and 5,291,269 which have been incorporated by reference herein.

It should be understood that the foregoing description is only illustrative of the invention. Various alternatives and modifications can be devised by those skilled in the art without departing from the spirit of the invention. Accordingly, the present invention is intended to embrace all such alternatives, modifications and variations which fall within the scope of the appended claims.

What is claimed is:

1. An oblique incidence multispectral interferometric apparatus for measuring gross surface height errors or for measuring the total thickness of a substrate comprising:

first multispectral light source;

a support associated with said source arranged to hold said substrate so that the light from said source strikes a first surface of said substrate at an oblique incidence;

a first reference flat arranged between said light source and said substrate so as to define an air space between said first surface of said substrate and a first optically flat surface of said first reference flat which faces said first surface of said substrate; and a camera for imaging the fringes formed by the reflected light from said air space.

2. An apparatus as in claim 1 wherein said camera comprises an electronic camera employing a CCD array for imaging said fringes.

3. An apparatus as in claim 2 wherein said CCD array is tiltably supported relative to an axis of the reflected light so as to permit substantially the entire first surface of the substrate to be in focus.

4. An apparatus as in claim 2 wherein the optical bandwidth of said light source is from about 10µ to about 50µ, the incidence angle of the said light is from about 70° to about 85° and said air space from the first surface of said substrate to said first optically flat surface is less than about 100 microns.

5. An apparatus as in claim 1 wherein the optical bandwidth of said light source is from about 10μ to about 50μ, the incidence angle of the said light is from about 70° to about 85° and said air space from the first surface of said substrate to said first optically flat surface is less than about 100 microns.

6. An oblique incidence multispectral interferometric apparatus for measuring gross surface height errors or for measuring the total thickness of a substrate having a first surface and an opposing second surface comprising:

first multispectral light source;

a support associated with said source arranged to hold said substrate so that the light from said source strikes said first surface of said substrate at an oblique incidence;

a first reference flat associated with said support and arranged between said first light source and said substrate so as to define a first air space between said first surface of said substrate and a first optically flat surface of said first reference flat which faces said first surface of said substrate;

a first camera associated with said support for imaging the fringes formed by the reflected light from said first air space;

a second multispectral light source associated with said support so that the light from said second source strikes said second surface of said substrate at an oblique incidence;

a second reference flat arranged between said second light source and said second surface of said substrate so as to define a second air space between said second surface of said substrate and a second optically flat surface of said second reference flat which faces said second surface of said substrate;

a second camera for imaging the fringes formed by the reflected light from said second air space.

7. An apparatus as in claim 6 wherein said first and second cameras comprise electronic cameras, each employing a CCD array for imaging said fringes.

8. An apparatus as in claim 7 wherein each of said CCD arrays is tiltably supported relative to an axis of the respective reflected light from the first and second air spaces so as to permit substantially the entire substrate's first surface and second surfaces respectively to each be in focus.

9. An apparatus as in claim 8 wherein the optical bandwidth of said first and said second light sources is from about 10μ to about 50μ, the incidence angle of the said light from each of said light sources on the respective first and second surfaces of said substrate is from about 70° to about 85° and each of said first and second air spaces is less than about 100 microns from the respective first or second surfaces of said substrate to the respective first and second optically flat surfaces.

10. An apparatus as in claim 6 wherein the optical bandwidth of said first and said second light sources is from about 10μ to about 50μ, the incidence angle of the said light from each of said light sources on the respective first and second surfaces of said substrate is from about 70° to about 85° and each of said first and second air spaces is less than about 100 microns from the respective first or second surfaces of said substrate to the respective first and second optically flat surfaces.

11. An apparatus as in claim 6 wherein said substrate is generally planar and wherein said support holds said substrate so that the plane of said substrate is generally vertical so as to minimize gravitational effects on said substrate.

12. A process for measuring gross surface height errors in a substrate surface or for measuring the total thickness of a substrate comprising:

providing a support surface for supporting said substrate;

providing a reference flat having a first optically flat surface in a spaced apart relationship relative to said support surface to define a first air space;

applying multispectral light at an oblique incidence to said first air space;

imaging the fringes formed by the reflected light from said first air space to measure the thickness of said first air space;

supporting said substrate on said support surface so as to define a second air space between a first surface of said substrate and the first optically flat surface of said reference flat;

applying multispectral light at an oblique incidence to said second air space;

imaging the fringes formed by the reflected light from said second air space to measure the thickness of said second air space; and subtracting the thickness of said second air space from said first air space to determine the thickness of said substrate.

13. A process as in claim 12 wherein said step of imaging the fringes comprises providing an electronic camera having a CCD array for imaging said fringes and tilting the CCD array relative to an axis of the reflected light so as to permit substantially the entire first surface of said substrate to be in focus.

14. A process as in claim 13 wherein the optical bandwidth of said light source is from about 10μ to about 50μ, the incidence angle of the said light is from about 70° to about 85° and said air space from the first surface of said substrate to said first optically flat surface is less than about 100 microns.

15. A process as in claim 12 wherein the optical bandwidth of said light source is from about 10μ to about 50μ, the incidence angle of the said light is from about 70° to about 85° and said air space from the first surface of said substrate is said first optically flat surface is less than about 100 micros.

16. A process for measuring gross surface height errors in a substrate surface or for measuring the total thickness of a substrate comprising:

providing a support for supporting said substrate;

providing a first reference flat adjacent said support having a first optically flat surface and a second reference flat adjacent said support having a second optically flat surface in a spaced apart relationship relative to said first optically flat surface to define a first air space;

applying multispectral light at an oblique incidence to said first air space;

imaging the respective fringes formed by the reflected light from said first air space to measure the respective thickness of said first air space; supporting said substrate on said support between and spaced from said first and second optically flat surfaces so as to define a second air space between a first surface of said substrate and the first optically flat surface of said first reference flat and a third air space between a second opposing surface of said substrate and the second optically flat surface of said second reference flat;

applying multispectral light at an oblique incidence respectively to said second and third air spaces;

respectively imaging the fringes formed by the reflected light from each of said second and third air spaces to measure the respective thicknesses of said second and third air spaces; and subtracting the thicknesses of said second and third air spaces from said first air space thickness to determine the thickness of said substrate.

17. A process as in claim 16 wherein said step of imaging the fringes comprises providing first and second electronic cameras each having a CCD array for imaging said fringes and tilting the respective CCD array relative to the respective axis of the reflected light so as to permit substantially the entire first and opposing second surfaces of said substrate to be in focus.

18. A process as in claim 17 wherein the optical bandwidth of said light is from about 10μ to about 50μ, the incidence angle of the said light is from about 70° to about 85° and said air space from the first surface of said substrate to said first optically flat surface is less than about 100 microns.

19. A process as in claim 16 wherein the optical bandwidth of said light source is from about 10μ to about 50μ, the incidence angle of the said light is from about 70° to about 85° and said air space from the first surface of said substrate to said first optically flat surface is less than about 100 microns.

20. A process as in claim 16 wherein said substrate is generally planar and wherein said substrate is held by said support so that the plane of said substrate is generally vertical so as to minimize gravitational effects on said substrate.

21. A process as in claim 12 wherein said substrate is a semiconductor wafer.

22. A process as in claim 16 wherein said substrate is a semiconductor wafer.

* * * * *